United States Patent
Orazio et al.

(10) Patent No.: US 11,880,482 B2
(45) Date of Patent: Jan. 23, 2024

(54) SECURE SMART CONTAINERS FOR CONTROLLING ACCESS TO DATA

(71) Applicant: International Business Machines Corporation, Armonk, NY (US)

(72) Inventors: Arielle Tovah Orazio, Wood-Ridge, NJ (US); Matthias Seul, Pleasant Hill, CA (US); Christopher Pepin, New Fairfield, CT (US); Lloyd Wellington Mascarenhas, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 17/117,457

(22) Filed: Dec. 10, 2020

(65) Prior Publication Data

US 2022/0188445 A1 Jun. 16, 2022

(51) Int. Cl.
| | | |
|---|---|---|
| *H04L 29/06* | (2006.01) | |
| *G06F 21/62* | (2013.01) | |
| *G06F 21/60* | (2013.01) | |
| *G06F 21/31* | (2013.01) | |
| *G06F 9/455* | (2018.01) | |

(52) U.S. Cl.
CPC ...... *G06F 21/6227* (2013.01); *G06F 9/45558* (2013.01); *G06F 21/31* (2013.01); *G06F 21/602* (2013.01); *G06F 21/604* (2013.01); *G06F 2009/45587* (2013.01)

(58) Field of Classification Search
CPC ... G06F 21/6227; G06F 9/45558; G06F 21/31
See application file for complete search history.

(56) References Cited

U.S. PATENT DOCUMENTS

| | | | |
|---|---|---|---|
| 6,598,161 B1 * | 7/2003 | Kluttz | G06F 21/6209 |
| | | | 713/168 |
| 7,685,645 B2 | 3/2010 | Doyle | |
| 8,424,098 B2 * | 4/2013 | Bhatia | G06F 21/31 |
| | | | 713/182 |

(Continued)

FOREIGN PATENT DOCUMENTS

| | | |
|---|---|---|
| CN | 104067285 B | 9/2014 |
| CN | 104573507 A | 4/2015 |

(Continued)

OTHER PUBLICATIONS

Combined Search and Examination Report in GB Application No. GB2117000.6, dated May 17, 2022, 7 pages.

(Continued)

*Primary Examiner* — Jason K Gee
(74) *Attorney, Agent, or Firm* — Edell, Shapiro & Finnan, LLC

(57) ABSTRACT

A computer system controls access to data. A secure container that is based on an image file is instantiated at an endpoint device of a user, wherein the secure container includes encrypted data corresponding to the user. An access request to the secure container is authenticated by verifying credentials of the user. In response to verifying the credentials of the user, access to the data is granted. Access to the data is controlled by decrypting and enabling access to a portion of the data, wherein additional portions of the data are decrypted and made accessible based on user behavior.

21 Claims, 6 Drawing Sheets

(56) References Cited

U.S. PATENT DOCUMENTS

| | | | |
|---|---|---|---|
| 9,858,428 B2 | 1/2018 | Barton | |
| 9,904,791 B1* | 2/2018 | Thankappan | G06F 21/62 |
| 10,554,690 B2 | 2/2020 | Deluca | |
| 2007/0245409 A1* | 10/2007 | Harris | H04L 67/06 |
| | | | 726/5 |
| 2008/0307508 A1* | 12/2008 | Conley | G06F 21/725 |
| | | | 726/4 |
| 2013/0298256 A1* | 11/2013 | Barnes | H04L 63/04 |
| | | | 726/26 |
| 2015/0302220 A1 | 10/2015 | Cismas et al. | |
| 2016/0308839 A1 | 10/2016 | Chuang | |
| 2018/0260578 A1 | 9/2018 | Orloff | |
| 2019/0260753 A1 | 8/2019 | Lewis et al. | |
| 2020/0236123 A1* | 7/2020 | Kessel | H04L 67/1097 |
| 2020/0302074 A1* | 9/2020 | Little | G06F 21/6218 |

FOREIGN PATENT DOCUMENTS

| | | |
|---|---|---|
| CN | 107634951 A | 1/2018 |
| CN | 110768792 A | 2/2020 |
| RU | 2525481 C2 | 5/2014 |
| WO | 2017138976 A1 | 8/2017 |
| WO | 2019215498 A1 | 11/2019 |

OTHER PUBLICATIONS

Response to Examination Report dated May 17, 2022 in UK Application No. 2117000.6, filed on Feb. 9, 2023, 15 pages.

* cited by examiner

SECURE SMART CONTAINERS FOR CONTROLLING ACCESS TO DATA

BACKGROUND

Present disclosure embodiments relate to data access, and more specifically, to secure smart containers that store data and control access to the stored data.

Users often exchange data that is deemed sensitive, confidential, or otherwise worthy of safeguarding from others. Conventional solutions to controlling access to data, such as public-key cryptography and user-based access controls, have various strengths and weaknesses. However, conventional approaches cannot account for security threats arising when an unauthorized individual gains access to data or when an authorized user begins to perform illegitimate actions. For example, a member of an organization may decide to leak the organization's password-protected trade secrets, or a hacker may obtain access to encrypted data through illicit means. Thus, there is a need to control access to data in a manner that not only prevents unauthorized access, but also extends protections to accessible data.

SUMMARY

According to one embodiment of the present disclosure, a computer system controls access to data. A secure container that is based on an image file is instantiated at an endpoint device of a user, wherein the secure container includes encrypted data corresponding to the user. An access request to the secure container is authenticated by verifying credentials of the user. In response to verifying the credentials of the user, access to the data is granted. Access to the data is controlled by decrypting and enabling access to a portion of the data, wherein additional portions of the data are decrypted and made accessible based on user behavior.

BRIEF DESCRIPTION OF THE DRAWINGS

Generally, like reference numerals in the various figures are utilized to designate like components.

DETAILED DESCRIPTION

Figure 1:
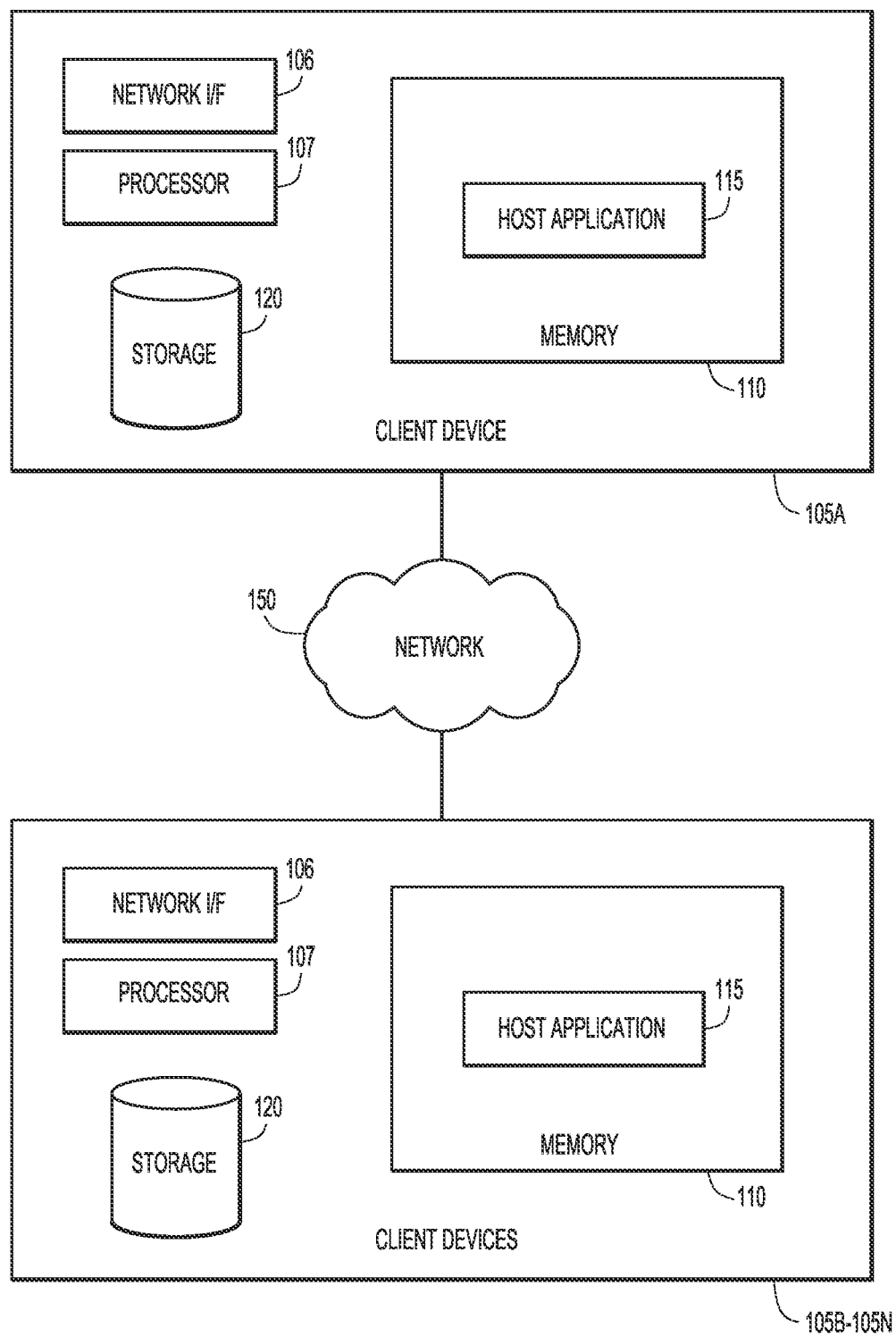
FIG. 1 is a block diagram depicting a computing environment for controlling access to data in accordance with an embodiment of the present disclosure.

Present disclosure embodiments relate to data access, and more specifically, to secure smart containers that store data and control access to the stored data. A container is a package of software that can include code for applications and other data. Designed for portability, a container typically includes dependencies for any included applications, enabling a containerized application to be executed quickly and reliably across various computing environments. In addition to supporting the execution of applications, containers can also store any desired data. For example, a container may include data in a proprietary format, which is made accessible to a user by an application that is also included in the container.

A container may be instantiated from an image file, which can be transferred between computing devices, e.g., via email. Instantiating a container at a computing device exposes a virtual file system and virtual files to the user. The virtual file system may store any data for which protection is desired in an encrypted form, and additionally, includes executable code for an enforcement engine that enables authorized users to access the data while monitoring the access. The enforcement engine can control access to data based on various factors, such as the nature of the access, the computing environment, the identity of the user, and/or user behavior.

Thus, present disclosure embodiments enable data to be securely shared and accessed while extending protection to the data during access events. In particular, data that is not currently being accessed remains encrypted, and even an authorized user may only access a portion of the data that the user is permitted to access at a time. Moreover, when a user accesses data, the user's behavior is monitored to identify any suspicious behavior, such as attempting to access more data at a time than is reasonably necessary to support the particular use-case or searching for suspicious keywords in data. Accordingly, present disclosure embodiments provide improvements to data access control, with the practical application of extending protection not only to the initial point of access but also during the entire time that a user accesses the data.

It should be noted that references throughout this specification to features, advantages, or similar language herein do not imply that all of the features and advantages that may be realized with the embodiments disclosed herein should be, or are in, any single embodiment of the disclosure. Rather, language referring to the features and advantages is understood to mean that a specific feature, advantage, or characteristic described in connection with an embodiment is included in at least one embodiment of the present disclosure. Thus, discussion of the features, advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

These features and advantages will become more fully apparent from the following drawings, description, and appended claims, or may be learned by the practice of embodiments of the disclosure as set forth hereinafter.

Present disclosure embodiments will now be described in detail with reference to the Figures. FIG. 1 is a block diagram depicting a computing environment 100 for controlling access to data in accordance with an embodiment of the present disclosure. As depicted, computing environment 100 includes a first client device 105A, one or more additional client devices 105B-105N, and a network 150. It is to be understood that the functional division among components of computing environment 100 has been chosen for purposes of explaining present disclosure embodiments and is not to be construed as a limiting example.

Each client device 105A-105N includes a network interface (I/F) 106, at least one processor 107, and memory 110 that includes a host application 115. Each client device 105A-105N may include a laptop computer, a tablet computer, a netbook computer, a personal computer (PC), a desktop computer, a personal digital assistant (PDA), a smartphone, a thin client, or any programmable electronic device capable of executing computer readable program instructions. Network interface 106 enables components of each client device 105A-105N to send and receive data over a network, such as the network 150. In general, client devices 105A-105N enables users to share data containers and access data in a controlled manner. For example, a user of client device 105A may add data to a container, which is securely saved as an image file and transferred to another device, such as client device 105B, for another user to access. Each client device 105A-105N may include internal and external hardware components, as depicted and described in further detail with respect to FIG. 6.

Host application 115 may include one or more modules or units to perform various functions of present disclosure embodiments described below. Host application 115 may be implemented by any combination of any quantity of software and/or hardware modules or units and may reside within memory 110 of any of client devices 105A-105N for execution by a processor, such as processor 107.

In some embodiments, host application 115 enables a user to create a secure container and add data to the container. A user of client device 105A may define a container according to one or more parameters, such as a size of the container, a file system type for the container, a data encryption type for data that is securely stored in the container, and the like. Additionally, when a user creates a container via host application 115, the user may select options to define which actions or occurrences constitute data access violations. For example, a container's enforcement engine may detect an access violation and subsequently block a user from accessing data when the container is instantiated in an unauthorized computing environment, when the user attempts to query data using a particular word or phrase, or when the user attempts to access data at a rate that exceeds any legitimate use-case. Once the user finalizes the configuration for a container, data may be added to the container, and user access permissions can be defined for the data. For example, the data can be encrypted such that different users can access different portions of the data using unique passwords or access keys. When a container is finalized, an image file corresponding to the container can be saved to a non-volatile storage medium, such as storage 120. Container creation is depicted and described in further detail below with respect to FIG. 3.

Once an image file of a container is created, a user of client device 105A can share the image file with other users and/or devices, such as client devices 105B-105N. The image file of a container can be transferred via any conventional or other data transfer technique, such as a file transfer facilitated by a communication network (e.g., network 150) or by physically conveying the image file using a removable storage device. When the image file is received at another computing device, such as client devices 105B-105N, the image file can be instantiated as a container, and once a user is authenticated, the secure data can be accessed at the computing device. Client devices 105B-105N may include client devices of other users and/or other client devices associated with the creator of the container (e.g., the user of client device 105A). When a data access session is completed, any changes to the data may be saved to the image file, which can then be distributed to additional users and/or computing devices. In some embodiments, users may collaborate by sharing a link to an image file, which is stored in a network-accessible location. Accessing data in a data container is depicted and described in further detail below with respect to FIGS. 2 and 4.

Storage 120 may include any non-volatile storage media known in the art. For example, storage 120 can be implemented with a tape library, optical library, one or more independent hard disk drives, or multiple hard disk drives in a redundant array of independent disks (RAID). Similarly, data in storage 120 may conform to any suitable storage architecture known in the art, such as a file, a relational database, an object-oriented database, and/or one or more tables. In some embodiments, storage 120 stores data related to image files, computing environment data (e.g., operating system data, program data, metadata such as versioning information, etc.), data that is added to, or obtained from, containers, and the like.

Network 150 may include a local area network (LAN), a wide area network (WAN) such as the Internet, or a combination of the two, and includes wired, wireless, or fiber-optic connections. In general, network 150 can be any combination of connections and protocols known in the art that will support communications between client devices 105A-105N via their respective network interfaces in accordance with embodiments of the present disclosure.

Figure 2:
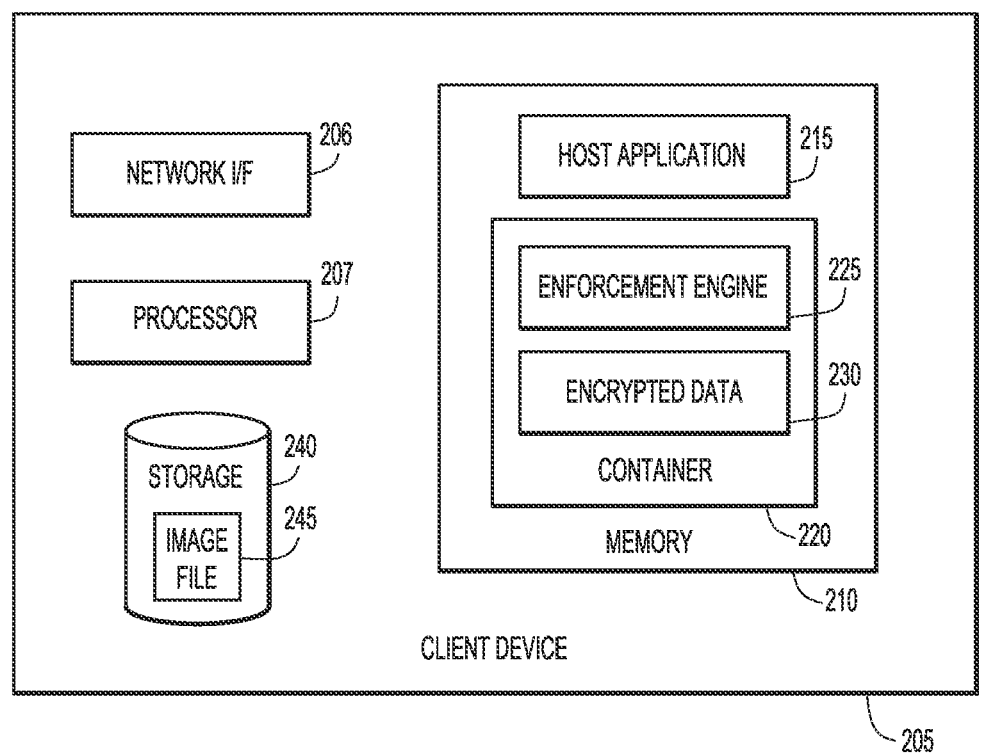
FIG. 2 is a block diagram depicting a computing system for controlling access to data in accordance with an embodiment of the present disclosure.

FIG. 2 is a block diagram depicting a computing system 200 for controlling access to data in accordance with an embodiment of the present disclosure. As depicted, computing system 200 includes a client device 205, a network interface 206, a processor 207, memory 210, and storage 240. Memory 210 may include an operating system 212, a host application 215, a container 220 with an enforcement engine 225 and encrypted data 230, and accessible data 235. Storage 240 may include one or more image files, such as image file 245.

Client device 205 may be implemented by any of client devices 105A-105N of computing environment 100, depicted and described in further detail with reference to FIG. 1. Client device 205 may include a laptop computer, a tablet computer, a netbook computer, a personal computer (PC), a desktop computer, a personal digital assistant (PDA), a smartphone, a thin client, or any programmable electronic device capable of executing computer-readable program instructions. Network interface 106 enables components of client device 205 to send and receive data over a network. In general, client device 205 enables a user to access a secure data container. Client device 205 may include internal and external hardware components, as depicted and described in further detail with respect to FIG. 6.

Operating system 212, host application 215, container 220, and enforcement engine 225 may include one or more modules or units to perform various functions of present disclosure embodiments described below. Operating system 212, host application 215, container 220, and enforcement engine 225 may be implemented by any combination of any quantity of software and/or hardware modules or units and may reside within memory 210 of client device 205 for execution by a processor, such as processor 207.

Operating system 212 may include any conventional or other operating system software for a computing device, such as Microsoft® Windows® or a distribution of Linux®. Host application 215 may be installed in operating system 212 so that instantiated containers can be integrated into operating system 212 and presented as a virtual filesystem.

Host application 215 enables image files to be generated, and enables image files to be instantiated as containers. Host application 215 may be a daemon process that utilizes one or more application programming interfaces (APIs) to enable containerized applications to interact with software outside of the container, such as operating system 212 of client device 205 and/or any applications installed on client device 205. When host application 215 instantiates a container, such as container 220, the container may be integrated into the operating system 212 of client device 205 as a virtual file system or virtual folder, a network drive, or any conventional or other forms of data medium. In some embodiments, accessible data is presented to a user of client device 205 using an operating system integration component, such as a driver (e.g., FUSE for macOS®), or a virtual file system can be exposed similarly to a mounted drive.

Container 220 is a secure data container that is instantiated into memory 210 of client device 205 by host application 215 so that a user may access executables and data stored in container 220. Container 220 is instantiated based on an image file, such as image file 245. Container 220 may include encrypted data 230, and a portion that is not subject to encryption and that includes enforcement engine 225. In some embodiments, container 220 includes an operating system, separate from operating system 212, and/or any dependencies that enforcement engine 225 requires in order to perform aspects of embodiments of the present disclosure. For example, container 220 may include a lightweight operating system such as CentOS™ and/or encryption software such as Amazon® Elastic File System or VeraCrypt.

Enforcement engine 225 resides in a non-encrypted portion of container 220 and includes executable code to authenticate a user to access data residing in encrypted data 230. Additionally, enforcement engine 225 may monitor a user, control access to data, and perform security actions if necessary. Enforcement engine 225 may access components of client device 205 that are external to container 220 via host application 215. For example, enforcement engine 225 may access peripherals of client device 205 to track user input, may access other portions of memory 210 to detect malicious or other software executing on client device 205, may access storage 240 to identify stored data, and the like.

When an authorized user submits a key to access encrypted data, enforcement engine 225 may verify the key and process encrypted data 230, decrypting some or all of the data and providing the decrypted data to memory as accessible data 235. In some embodiments, accessible data 235 is presented to operating system 212 of client device 205 by virtualizing accessible data 235 as a network connection or stream of data. Accessible data 235 may be presented as a virtual drive that is separate from the virtual drive of container 220, or accessible data 235 may be presented in the same virtual drive as container 220. Enforcement engine 225 may only place a portion of encrypted data 230 at a time in accessible data 235, so that a user is prevented from accessing the entirety of the data included in encrypted data 230. When a user is finished accessing a current portion of data, accessible data 235 may be refreshed with the next portion of data by decrypting and transferring the next portion from encrypted data 230 to accessible data 235.

When a user submits a key to request access to data, enforcement engine 225 may also verify other circumstances of the access request. In some embodiments, enforcement engine 225 authenticates the request based on the computing environment of client device 205. For example, the access control settings for a container may indicate that the container can only be accessed by certain devices, which can be defined by a hostname, a Media Access Control (MAC) address, an Internet Protocol (IP) address, or other unique software-based or hardware-based identifier. In some embodiments, enforcement engine 225 may permit access to secured data based on a geographical location of client device 205, which can be obtained using the Global Positioning System (GPS), radio tower triangulation, and the like. For example, data in a container may only be accessed when a user is in a particular city, state, or country, or the presence of client device 205 in certain locations may prevent data from being accessed. In some embodiments, enforcement engine 225 compares a current access location to a previous access location, which can include a comparison of geographical locations, logical locations (e.g., computing environments), or both. Thus, for example, enforcement engine 225 may prevent access when a current access location exceeds a threshold amount of distance from a previous access location and/or when the container was previously accessed using a different operating system.

Enforcement engine 225 may monitor a user's interactions with accessible data 235 in order to control access to data. When enforcement engine 225 determines that an access violation (e.g., any unauthorized access to data) has occurred, enforcement engine 225 may perform actions to prevent subsequent user access to accessible data 235. In various embodiments, enforcement engine 225 may determine that an access violation has occurred when a user searches for a particular word or phrase that is included on a list, when a user attempts to access data too quickly, and the like. Enforcement engine 225 may employ a rules-based scoring of user behavior to determine that an access violation has occurred when user behavior causes a total risk score to exceed a predetermined threshold.

Storage 240 may include any non-volatile storage media known in the art. For example, storage 240 can be implemented with a tape library, optical library, one or more independent hard disk drives, or multiple hard disk drives in a redundant array of independent disks (RAID). Similarly, data in storage 240 may conform to any suitable storage architecture known in the art, such as a file, a relational database, an object-oriented database, and/or one or more tables. In some embodiments, storage 240 stores data relating to one or more image files, such as image file 245. When a user unmounts container 220, any changes to the protected data are saved, and image file 245 is updated accordingly. When a user unmounts container 220, an access log corresponding to the protected data may be updated, including a timestamp of any read and write operations. Version control may be implemented to provide version numbers upon changes to the container.

Figure 3:
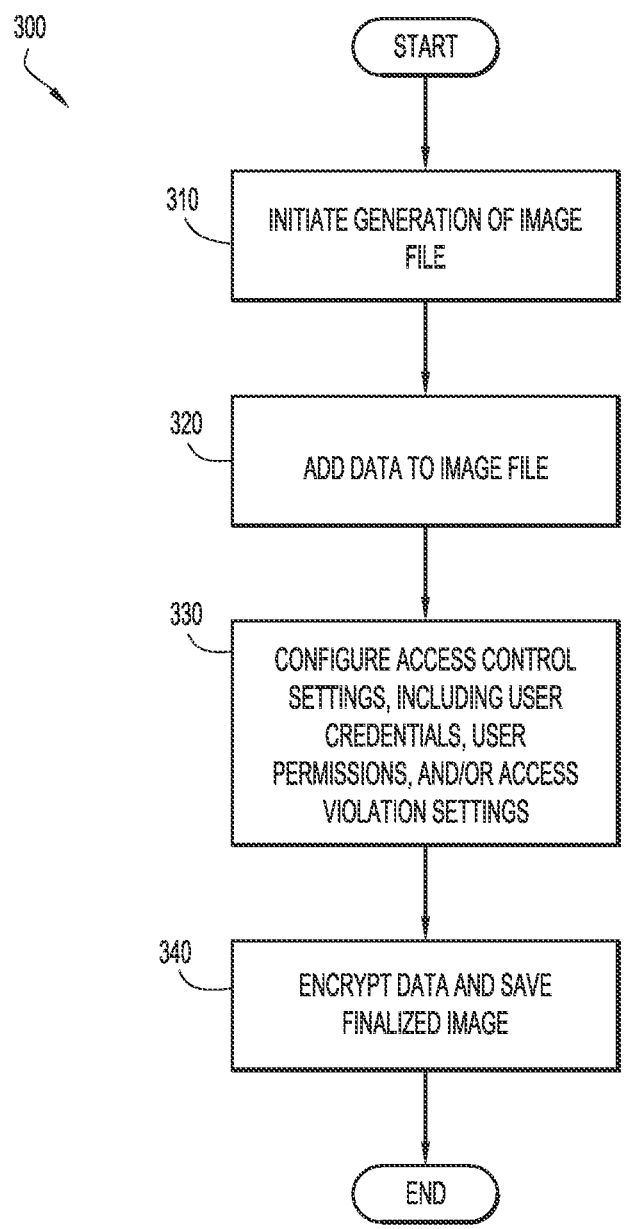
FIG. 3 is a flow chart depicting a method of creating a data container in accordance with an embodiment of the present disclosure.

FIG. 3 is a flow chart depicting a method 300 of creating a data container in accordance with an embodiment of the present disclosure.

Generation of an image file is initiated at operation 310. A user may request a new image file to be generated by defining properties of the resulting container, such as the data size of the container, encryption settings for the container's encrypted data portion, operating system settings for the container, if any, a name for the container, and other settings, such as optional executables to be included in the container and the like. A user may also define file system settings for any virtual file system presented by the container.

Data is added to the image file at operation 320. A user may include any data for which protection is desired in the image file. In some embodiments, a user may add data that is organized into directories, which can include multiple files and folders.

Access control settings are configured at operation 330, including user credentials, user permissions, and/or access violation settings. The creator of an image file can add user accounts that can access the container, along with corresponding access keys for each account. In some embodiments, each user account can include one or more of a user account name, a name of the user (e.g., a legal name or nickname), a job or role in an organization, a time limit or expiration date for data access, and a unique access key. Rules can be established for user account permission on a file-by-file basis. For example, if a container includes two hundred files that are sequentially numbered, a first user may be able to access files one through one hundred, a second user may only be able to access files six through nine, and a third user may be able to access all two hundred files. In some embodiments, rules may be established concerning the nature of access to files. For example, a first user may have read access, and a second user may have read and write access. In some embodiments, documents can be classified according to escalating levels of sensitivity, and an access level can be defined for each user account, enabling users to access any data at or below their access level.

The data is encrypted, and a finalized image is saved at operation 340. The data for which protection is desired is encrypted, and the image is finalized by adding executable code, such as the code for enforcement engine 225 and any dependencies, operating system code, and the like. The resulting image file can be saved to non-volatile storage for subsequent transmission and/or use.

Figure 4:
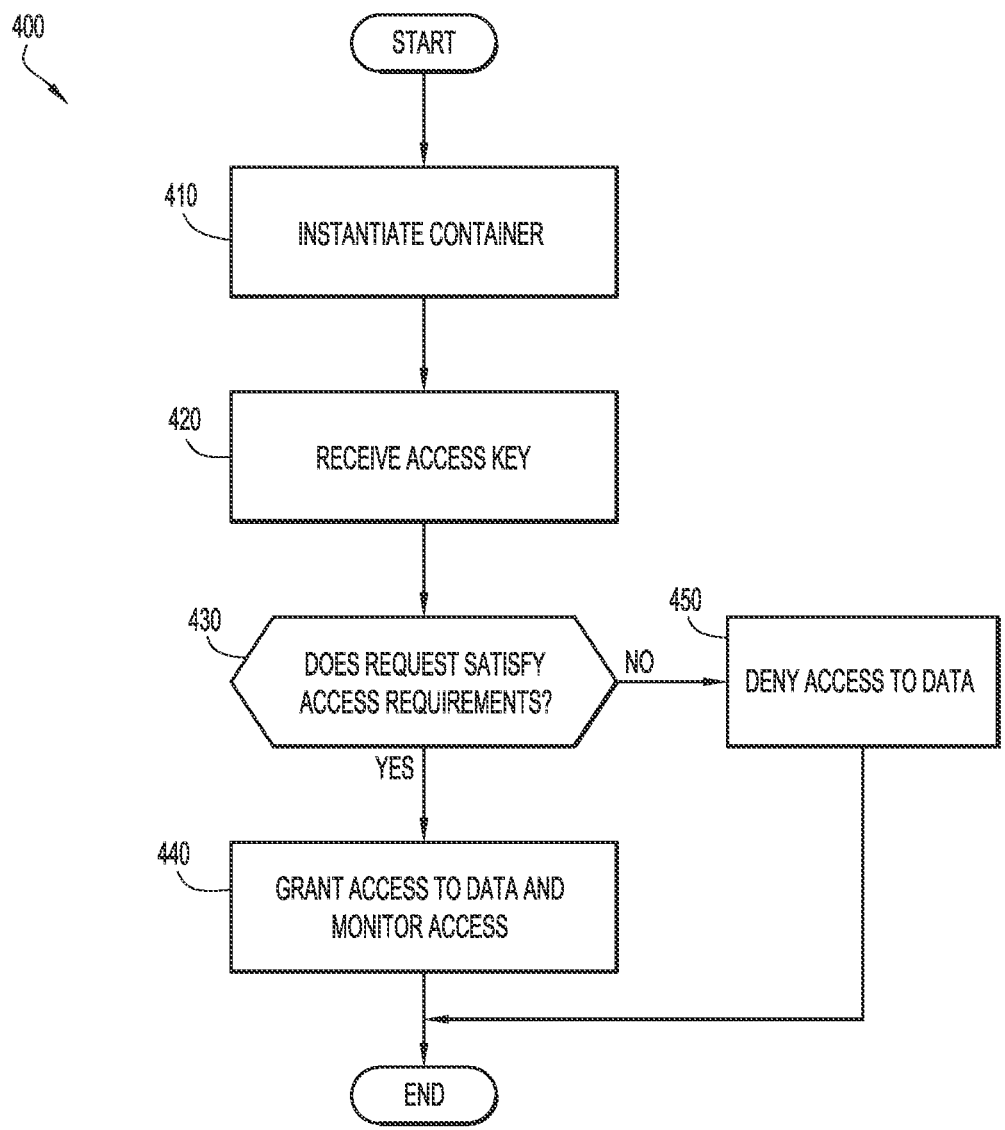
FIG. 4 is a flow chart depicting a method of accessing data stored in a data container in accordance with an embodiment of the present disclosure.

FIG. 4 is a flow chart depicting a method 400 of accessing data stored in a data container in accordance with an embodiment of the present disclosure.

A container is instantiated at operation 410. A user of a computing device, such as any of client devices 105A-105N, may obtain or receive an image file that can be instantiated into a container via a host application that is installed on the user's computing device. In some embodiments, the image file is stored locally at the computing device, and in other embodiments, the image file may be located in a network-accessible location.

The access key is received at operation 420. Initially, access keys may be created at generation of a new image file and/or when a new authorized user is added to a container. The creator or other authorized individual may provide authorized users with access keys. For example, a user may be provided with his or her access key through a different communication channel than how the user accesses the image file. When a user instantiates a container, a virtual file system is mounted at the user's computing device, and enforcement engine 225 may begin execution, prompting the user to provide an access key. Additionally or alternatively, enforcement engine 225 may obtain details relating to the local environment in which the access request is placed, such as the operating system of the computing device, the geographical location of the computing device, and the like.

Operation 430 determines whether the access request satisfies all access requirements. In some embodiments, the user's access key is verified. Additionally or alternatively, the information gathered about the local environment can be verified by enforcement engine 225. For example, enforcement engine 225 may verify that the container has been instantiated at the same computing device through which the container was previously accessed, or enforcement engine 225 may verify that the container is not being instantiated by a computing device in another country.

If the access request, including the access key and any other requirements, satisfies the access requirements, then access to data is granted at operation 440. Enforcement engine 225 may decrypt portions or all of the encrypted data, making the data available to the authenticated user. Accessible data may be created in an ad hoc manner as files presented in a virtual file system. While data is accessible to the user, activity of the computing device and user behavior may be monitored and analyzed by enforcement engine 225 in order to safeguard the protected data.

In some embodiments, portions of the encrypted data are made accessible at a time, and when a user is finished with a particular portion, a subsequent portion may be made available. Thus, the entirety of the protected data will not be exposed to memory at any given time. For example, a user reading or editing a text file may arrive at an end of a portion of the file, and may be instructed to close and re-open the file. When the user closes the file, enforcement engine 225 may overwrite the file in the virtual file system with data corresponding to a subsequent portion of the protected data. In some embodiments, enforcement engine 225 may virtualize the source of the accessible data as a network data stream, enabling an application to access and present the data in the event that the application would not otherwise be able to open an incomplete file.

If the access requirements are not satisfied, then access to the data is denied at operation 450. In some embodiments, a user may be prevented from attempting to access the data after one or more failed attempts. In some embodiments, when access to the data is denied, the container may be unmounted from the computing device. Enforcement engine 225 may perform additional security actions, such as deleting the encrypted data, or causing the image file to be deleted upon unmounting of the container. Thus, a container may self-destruct in order to protect data.

In some embodiments, a user may provide an alternative key at operation 420 that is not an access key, but is rather a distress code or other indicator of distress. For example, instead of entering the user's access key, a user may enter a string of zeros that indicates that the user is under duress. When a distress indicator is received, enforcement engine 225 may display mock data that appears genuine, but is not actually the data that is being protected by the container. The mock data may be completely different from the actual data, or may be based on the actual data. The mock data can be uniquely identified by inserting a secret phrase or watermark so that when the mock data is leaked, the identity of the source and/or perpetrator can be identified.

Figure 5:
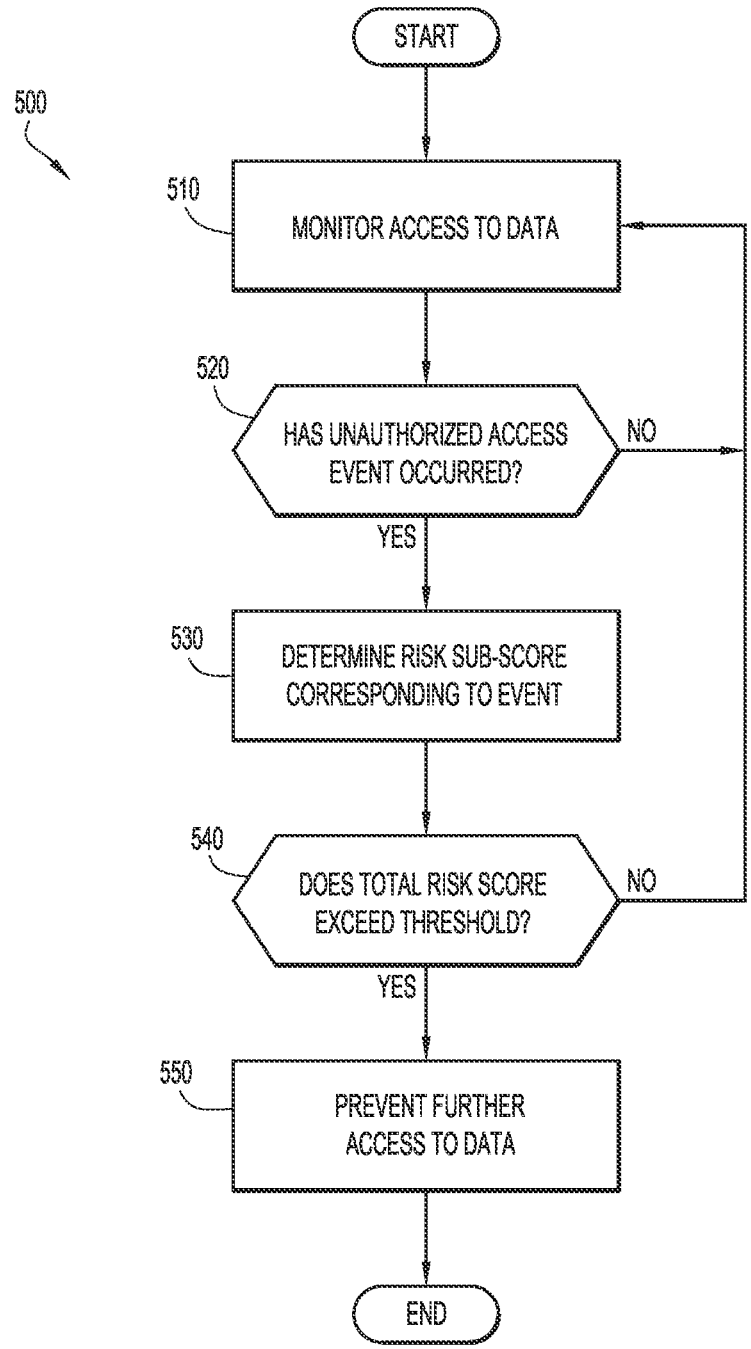
FIG. 5 is a flow chart depicting a method of detecting a data access violation in accordance with an embodiment of the present disclosure.

FIG. 5 is a flow chart depicting a method 500 of detecting a data access violation in accordance with an embodiment of the present disclosure.

Access to data is monitored at operation 510. When a user's access to a container is authenticated, enforcement engine 225 may monitor user behavior by accessing the operating system of the user's computing device or by tracking the user's read and/or write operations with respect to the accessible data. Enforcement engine 225 may continuously monitor for any activity that is suspicious or potentially suspicious as long as protected data is made accessible to the user.

Operation 520 determines whether an unauthorized access event has occurred. A rules-based approach may be utilized so that enforcement engine 225 can determine when an unauthorized access event has occurred. Rules may be defined at the creation of the image file, and can include rules for any activity, such as a user searching for a word or phrase that appears on an suspicious query list, copy-and-paste operations, saving accessed data to a hard drive, forwarding accessed data in an email, executing certain applications, and the like. In some embodiments, conventional or other machine learning techniques may be applied by training a model to detect suspicious user behavior and to accordingly generate rules for detecting unauthorized access events. If no unauthorized access event has occurred, enforcement engine 225 continues monitoring at operation 510.

A risk sub-score corresponding to the access event is determined at operation 530. In some embodiments, different risk sub-score values can be associated with different unauthorized access events, so that events can be scored according to their severity. For example, risk sub-scores can be provided according to Table 1.

TABLE 1

| Unauthorized Access Event | User Activity | Risk Sub-Score |
| --- | --- | --- |
| User queried data with word or phrase on unauthorized word list | Yes - one word/phrase (e.g., "bid") | 2 |
| User queried data with word or phrase on unauthorized word list | Yes, three or more words/phrases (e.g., "bid," "competitor," "hack") | 10 |
| User highlighted or copy-and-pasted text from document | Yes - one suspicious line (e.g., "competitor research") | 2 |
| User highlighted or copy-and-pasted text from document | Yes - two or more suspicious lines | 10 |
| User searched for word or phrase unrelated to current role | Yes - one suspicious word or phrase (e.g., role = marketing and phrase = "competitor research") | 5 |
| User searched for word or phrase unrelated to current role | Yes - three or more suspicious words or phrases | 8 |
| User accessed files/documents from different locations | Yes - one device, two locations | 2 |
| User accessed files/documents from different locations | Yes - one device unassociated with organization, three locations | 10 |
| User tried to forward documents to unauthorized user | Yes - same organization email address | 2 |
| User tried to forward documents to unauthorized user | Yes - external email address | 9 |
| User tried to save file in different format | Yes - using Powershell script | 5 |
| User tried to save file in different format | Yes - document reaching out to different IP address or using a macro | 10 |

Operation 540 determines whether the total risk score satisfies a predetermined threshold value. In particular, the total risk score is computed by summing each of the risk sub-scores, and the total risk score is compared to a predetermined threshold value. If the total risk score does not satisfy the threshold value, then enforcement engine 225 continues to monitor access to data, and in the event that further unauthorized access events are detected, the total risk score is updated again after each unauthorized access event. In some embodiments, the total risk score decays over time.

In the event that the total risk score does satisfy the threshold value, further access to the data is prevented at operation 550. In various embodiments, mock data may be presented to a user, the container may be unmounted and the user's access key revoked, or the image file may be automatically destroyed.

Figure 6:
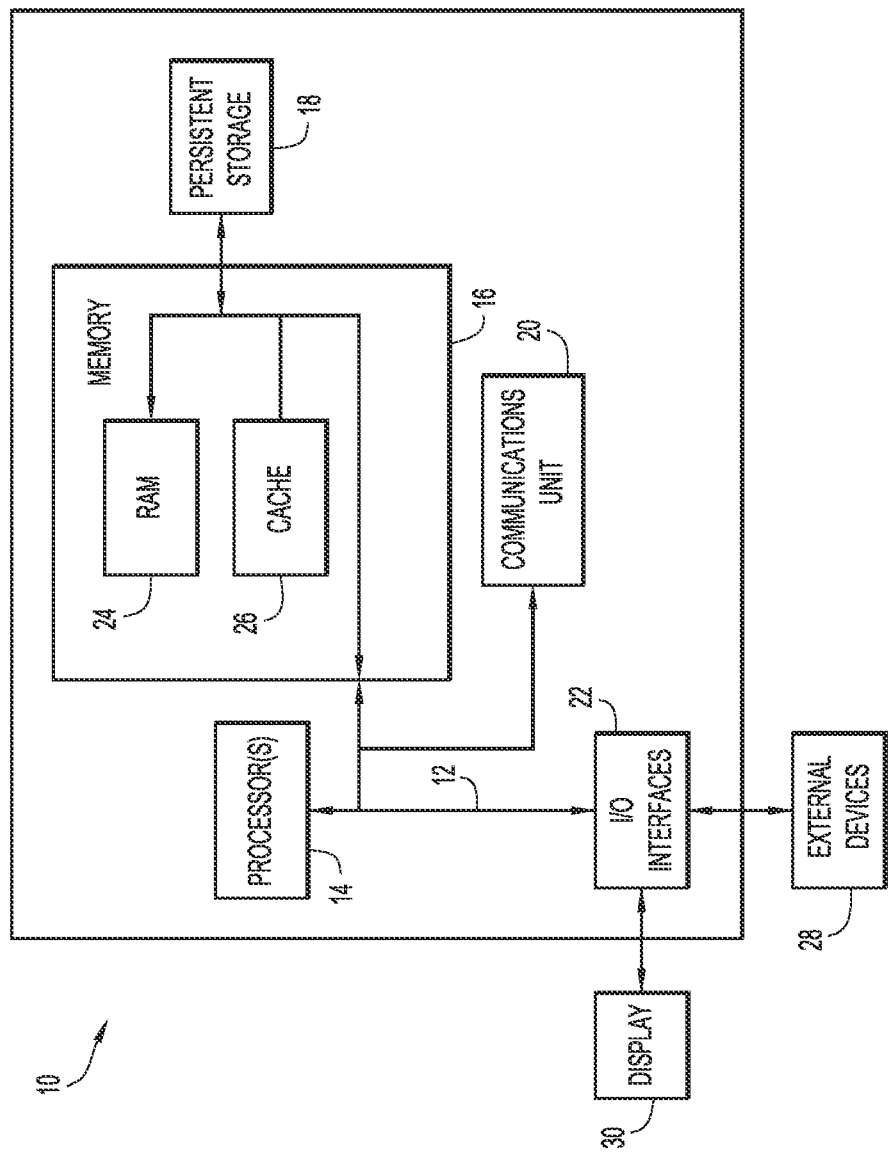
FIG. 6 is a block diagram depicting a computing device in accordance with an embodiment of the present disclosure.

FIG. 6 is a block diagram depicting components of a computer 10 suitable for executing the methods disclosed herein. Computer 10 may implement clients device 105A-105N and/or client device 205 in accordance with embodiments of the present disclosure. It should be appreciated that FIG. 6 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present disclosure can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

Data relating to secure smart containers that control access to data (e.g., image file data, container data, protected data, user permissions data, rules for suspicious access events, access history data, etc.) may be stored within any conventional or other data structures (e.g., files, arrays, lists, stacks, queues, records, etc.) and may be stored in any desired storage unit (e.g., database, data or other repositories, queue, etc.). The data transmitted between client devices 105A-105N may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to secure smart containers that control access to data (e.g., image file data, container data, protected data, user permissions data, rules for suspicious access events, access history data, etc.) may include any information provided to, or generated by, client devices 105A-105N. Data relating to secure smart containers that control access to data may include any desired format and arrangement, and may include any quantity of any types of fields of any size to store any desired data. The data relating to secure smart containers that control access to data may include any data collected about entities by any collection mechanism, any combination of collected information, and any information derived from analyzing collected information.

The present disclosure embodiments may employ any number of any type of user interface (e.g., Graphical User Interface (GUI), command-line, prompt, etc.) for obtaining or providing information (e.g., data relating to secure smart containers that control access to data), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of improving the security of data by preventing unauthorized data access and extending protection during legitimate or other access events.

The environment of the present disclosure embodiments may include any number of computer or other processing systems (e.g., client or end-user systems, server systems, etc.) and databases or other repositories arranged in any desired fashion, where the present disclosure embodiments may be applied to any desired type of computing environment (e.g., cloud computing, client-server, network computing, mainframe, stand-alone systems, etc.). The computer or other processing systems employed by the present disclosure embodiments may be implemented by any number of any personal or other type of computer or processing system (e.g., desktop, laptop, PDA, mobile devices, etc.), and may include any commercially available operating system and any combination of commercially available and custom software (e.g., communications software, operating system software, host application 115, host application 215, enforcement engine 225, etc.). These systems may include any types of monitors and input devices (e.g., keyboard, mouse, voice recognition, etc.) to enter and/or view information.

It is to be understood that the software (e.g., communications software, operating system software, host application 115, host application 215, enforcement engine 225, etc.) of the present disclosure embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present disclosure embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present disclosure embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present disclosure embodiments (e.g., communications software, operating system software, host application 115, host application 215, enforcement engine 225, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present disclosure embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to secure smart containers that control access to data). The database system may be implemented by any number of any conventional or other databases, data stores or storage structures (e.g., files, databases, data structures, data or other repositories, etc.) to store information (e.g., data relating to secure smart containers that control access to data). The database system may be included within or coupled to the server and/or client systems. The database systems and/or storage structures may be remote from or local to the computer or other processing systems, and may store any desired data (e.g., data relating to secure smart containers that control access to data).

The present disclosure embodiments may employ any number of any type of user interface (e.g., Graphical User Interface (GUI), command-line, prompt, etc.) for obtaining or providing information (e.g., data relating to secure smart containers that control access to data), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present disclosure embodiments are not limited to the specific tasks or algorithms described above, but may be utilized for any number of applications in the relevant fields, including, but not limited to, controlling access to data to prevent unauthorized access.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for controlling access to a secure container comprising:
  receiving, at an endpoint device, an image file;
  instantiating, at the endpoint device of a user, a secure container that is based on the image file, wherein the secure container includes encrypted data corresponding to a plurality of users including the user and an enforcement engine, and wherein the encrypted data is encrypted such that different users can access different portions of data;
  authenticating an access request to the secure container by verifying credentials of the user;
  in response to verifying the credentials of the user, granting access to data that the user is authorized to access;
  controlling access to the data, using the enforcement engine that is stored in the secure container, by decrypting and enabling access to a portion of the data that is also stored in the secure container, wherein additional portions of the data are decrypted and made accessible based on user behavior, and wherein each additional portion of the data is provided by providing instructions to the user to close a file comprising the portion of data, in response to the user closing the file, overwriting the file with an additional portion of data, providing instructions to the user to re-open the file, and in response to the user re-opening the file, providing the additional portion of data to the user;
  receiving one or more edits by the user to the data that the user is authorized to access;
  providing a modified image file including the one or more edits by the user; and
  transmitting the modified image file to a device of an additional user who has different access permissions to the data as compared to the user.

2. The computer-implemented method of claim 1, further comprising:
  analyzing the user behavior to determine that an access violation has occurred; and
  in response to determining that the access violation has occurred, suspending access to the data by the user.

3. The computer-implemented method of claim 2, wherein the user behavior is analyzed to identify one or more events, and wherein the access violation is determined by:
  calculating a total risk score based on one or more risk sub-scores corresponding to the identified one or more events; and
  determining that the total risk score satisfies a predetermined threshold value.

4. The computer-implemented method of claim 1, wherein the user behavior includes a rate of access to the data.

5. The computer-implemented method of claim 1, wherein the user behavior includes the user querying the data using one or more unauthorized query terms.

6. The computer-implemented method of claim 1, wherein authenticating the access request is further based on one or more from a group of: a computing environment of the endpoint device, a current location of the endpoint device, and a previous access location of the secure container.

7. The computer-implemented method of claim 1, further comprising: presenting mock data in response to determining that an access violation has occurred or in response to the access request including a distress indicator.

8. A computer system for controlling access to a secure container, the computer system comprising:
  one or more computer processors;
  one or more computer readable storage media;
  program instructions stored on the one or more computer readable storage media for execution by at least one of the one or more computer processors, the program instructions comprising instructions to:

receive, at an endpoint device, an image file;
instantiate, at the endpoint device of a user, a secure container that is based on the image file, wherein the secure container includes encrypted data corresponding to a plurality of users including the user and an enforcement engine, and wherein the encrypted data is encrypted such that different users can access different portions of data;
authenticate an access request to the secure container by verifying credentials of the user;
in response to verifying the credentials of the user, grant access to data that the user is authorized to access;
control access to the data, using the enforcement engine that is stored in the secure container, by decrypting and enabling access to a portion of the data that is also stored in the secure container, wherein additional portions of the data are decrypted and made accessible based on user behavior, and wherein each additional portion of the data is provided by providing instructions to the user to close a file comprising the portion of data, in response to the user closing the file, overwriting the file with an additional portion of data, providing instructions to the user to re-open the file, and in response to the user re-opening the file, providing the additional portion of data to the user;
receive one or more edits by the user to the data that the user is authorized to access;
provide a modified image file including the one or more edits by the user; and
transmit the modified image file to a device of an additional user who has different access permissions to the data as compared to the user.

9. The computer system of claim 8, wherein the program instructions further comprise instructions to:
analyze the user behavior to determine that an access violation has occurred; and
in response to determining that the access violation has occurred, suspend access to the data by the user.

10. The computer system of claim 9, wherein the user behavior is analyzed to identify one or more events, and wherein the access violation is determined by:
calculating a total risk score based on one or more risk sub-scores corresponding to the identified one or more events; and
determining that the total risk score satisfies a predetermined threshold value.

11. The computer system of claim 8, wherein the user behavior includes a rate of access to the data.

12. The computer system of claim 8, wherein the user behavior includes the user querying the data using one or more unauthorized query terms.

13. The computer system of claim 8, wherein authenticating the access request is further based on one or more from a group of: a computing environment of the endpoint device, a current location of the endpoint device, and a previous access location of the secure container.

14. The computer system of claim 8, wherein the program instructions further comprise instructions to: present mock data in response to determining that an access violation has occurred or in response to the access request including a distress indicator.

15. A computer program product for controlling access to a secure container, the computer program product comprising one or more computer readable storage media collectively having program instructions embodied therewith, the program instructions executable by a computer to cause the computer to:
receive, at an endpoint device, an image file;
instantiate, at the endpoint device of a user, a secure container that is based on the image file, wherein the secure container includes encrypted data corresponding to a plurality of users including the user and an enforcement engine, and wherein the encrypted data is encrypted such that different users can access different portions of data;
authenticate an access request to the secure container by verifying credentials of the user;
in response to verifying the credentials of the user, grant access to data that the user is authorized to access;
control access to the data, using the enforcement engine that is stored in the secure container, by decrypting and enabling access to a portion of the data that is also stored in the secure container, wherein additional portions of the data are decrypted and made accessible based on user behavior, and wherein each additional portion of the data is provided by providing instructions to the user to close a file comprising the portion of data, in response to the user closing the file, overwriting the file with an additional portion of data, providing instructions to the user to re-open the file, and in response to the user re-opening the file, providing the additional portion of data to the user;
receive one or more edits by the user to the data that the user is authorized to access;
provide a modified image file including the one or more edits by the user; and
transmit the modified image file to a device of an additional user who has different access permissions to the data as compared to the user.

16. The computer program product of claim 15, wherein the program instructions further cause the computer to:
analyze the user behavior to determine that an access violation has occurred; and
in response to determining that the access violation has occurred, suspend access to the data by the user.

17. The computer program product of claim 16, wherein the user behavior is analyzed to identify one or more events, and wherein the access violation is determined by:
calculating a total risk score based on one or more risk sub-scores corresponding to the identified one or more events; and
determining that the total risk score satisfies a predetermined threshold value.

18. The computer program product of claim 15, wherein the user behavior includes a rate of access to the data.

19. The computer program product of claim 15, wherein the user behavior includes the user querying the data using one or more unauthorized query terms.

20. The computer program product of claim 15, wherein authenticating the access request is further based on one or more from a group of: a computing environment of the endpoint device, a current location of the endpoint device, and a previous access location of the secure container.

21. The computer program product of claim 15, wherein the program instructions further cause the computer to: present mock data in response to determining that an access violation has occurred or in response to the access request including a distress indicator.

\* \* \* \* \*